United States Patent [19]
Georgitsis et al.

[11] Patent Number: 5,172,801
[45] Date of Patent: Dec. 22, 1992

[54] DEVICE FOR TWISTING WORKPIECES, PARTICULARLY FOR TURNING CASINGS

[75] Inventors: Nicolaus Georgitsis, Osterkappel; Rolf Zierdt, Seeheim, both of Fed. Rep. of Germany

[73] Assignee: Tetra PaK Holdings S.A., Pully, Switzerland

[21] Appl. No.: 711,081

[22] Filed: Jun. 6, 1991

[30] Foreign Application Priority Data

Jun. 14, 1990 [DE] Fed. Rep. of Germany ....... 4019031

[51] Int. Cl.$^5$ .............................................. B65G 29/00
[52] U.S. Cl. .................. 198/414; 198/346.2; 198/465.1
[58] Field of Search .................... 198/346.2, 414, 465.1

[56] References Cited

U.S. PATENT DOCUMENTS

| | | | |
|---|---|---|---|
| 3,271,840 | 9/1966 | Solski et al. | 198/414 |
| 3,783,994 | 1/1974 | Tomalty. | |
| 3,941,237 | 3/1976 | MacGregor, Jr. | |
| 4,457,419 | 7/1984 | Ogami et al. | 198/414 |
| 4,492,301 | 1/1985 | Inaba et al. | 198/465.1 |
| 4,509,892 | 4/1985 | Redeker et al. | |
| 4,633,620 | 1/1987 | Lorenzi et al. | |
| 4,736,830 | 4/1988 | Hofmann. | |
| 4,819,789 | 4/1989 | Linner. | |
| 4,938,334 | 7/1990 | McGinn | 198/414 |

FOREIGN PATENT DOCUMENTS

| | | |
|---|---|---|
| 489698 | 1/1930 | Fed. Rep. of Germany. |
| 1096285 | 12/1960 | Fed. Rep. of Germany. |
| 2845913 | 4/1980 | Fed. Rep. of Germany. |
| 2908343 | 9/1980 | Fed. Rep. of Germany. |
| 2255474 | 11/1980 | Fed. Rep. of Germany. |
| 2419133 | 5/1984 | Fed. Rep. of Germany. |
| 3416858 | 11/1985 | Fed. Rep. of Germany. |
| 2316355 | 2/1986 | Fed. Rep. of Germany. |
| 3430531 | 2/1986 | Fed. Rep. of Germany. |
| 8510749.2 | 9/1986 | Fed. Rep. of Germany. |
| 3603297 | 3/1989 | Fed. Rep. of Germany. |
| 3841171 | 6/1990 | Fed. Rep. of Germany. |

Primary Examiner—Joseph E. Valenza
Attorney, Agent, or Firm—Paul & Paul

[57] ABSTRACT

In order to twist single packs transported in a row through 90°, for example, in such a way that after all the packs have passed through the device, the row which is still disposed in the conveyer device is turned, it is proposed that a workpiece carrier (1) be arranged detachably on the conveyer line and be able to be brought to engage with a decoupling unit (E,E') which has a rotating member (5,5') driven pivotally with a first axis (6,6'), and that the first axis (6,6') is oriented vertically to the direction (3) of transportation of the conveyer device.

10 Claims, 7 Drawing Sheets

DEVICE FOR TWISTING WORKPIECES, PARTICULARLY FOR TURNING CASINGS

The invention relates to a device for twisting workpieces which are transported by a conveyer device.

When processing workpieces, if the workpieces are transported from one conveyer device to another location, again and again it is necessary to have the workpieces available for subsequent processing in other steps in other rotated positions, after they have been processed in the initial stages. Therefore, turning machines are installed upstream or downstream of conveyer devices, and this makes the processing machine as a whole large and expensive.

The aim of the invention is therefore to create a device of the kind mentioned in the introduction to twist workpieces, by means of which machine single workpieces transported in a row can be turned through 90°, for example, in such a way that after passing through the device all the workpieces of the row which is still disposed in the conveyer device are turned.

The problem is solved according to the invention in that a workpiece carrier is arranged detachably on the conveyer line and can be arranged so that it can be brought into engagement with a decoupling unit which has a rotating member pivotally driven about a first axis, and that the first axis is oriented vertically to the transportation direction of the conveyer device. By way of the invention, a special turning station is prevented from being installed upstream or downstream of the conveyer device. Instead of this, the workpieces are twisted, according to the invention, on the conveyer line itself. A decoupling unit with a rotating member which is driven about the afore-mentioned first axis of rotation disengages the workpiece carrier from the conveyer line, permits it to be rotated through the desired angle and then brings it back into engagement with the conveyer line.

Decoupling or releasing the workpiece carrier from the conveyer line and coupling or guiding it back into the position of engagement with the conveyer line is most successful using the pivotable rotating member, if, according to a further embodiment of the invention, the pivotable rotating member is driven so that it can move both with rotary movement and with translatory movement in the direction of the first axis of rotation. The pivotable rotating member can then actually release the workpiece by a translatory movement in a straight line in the direction of the first axis of rotation, whereupon the rotating member is pivoted through the desired angle, and the rotating member can then be guided back into the initial position by translatory movement through the same path in a straight line, so that the workpiece carrier is again connected to the conveyer line.

It is to be understood that when the workpiece carrier is being released, twisted and also guided back and engaged or connected to the conveyer line, the conveyer line is kept still. Using the conveyer device, the workpiece thus arrives at a first position of rotation, whereupon the conveyer line is brought to a standstill. The device according to the invention then decouples the workpiece carrier from the conveyer line, turns the workpiece together with the workpiece carrier, brings the workpiece carrier back into engagement with the conveyer line, and only then does the conveyer line move on. In this way, one workpiece after the other can be brought from a first position of rotation into a second one, in the region of the actual conveyer line, without special units having to be arranged upstream or downstream of the conveyer device.

It is also advantageous according to the invention if the transportation direction of the conveyer device is disposed horizontally, and if the first axis of rotation of the rotating member extends vertically, if the rotating member is in the form of a shaft mounted at at least two locations, and if the conveyer device has a continuous belt. Workpieces are often transported by conveyer devices which move in a direction which is horizontal in the region of the workpieces. It is, admittedly, also possible to imagine conveyers which extend inclinedly in the space, but the present invention, by way of example, relates to the horizontal conveyer device, with the result that the first axis of rotation of the rotating member extending vertically to the conveyer device is disposed so that it is vertical in the example under consideration here. In the case of the rotating member which is moved not only with rotary motion (for the purpose of being pivoted) but also with translatory movement, the rotating member is thus displaced in its own longitudinal extent vertically with a stroke movement from a first position into a second position and back again. To this end, it is expedient if the rotating member is designed as a shaft and if it is mounted at least two locations, so that the direction of translatory movement is fixed, and so that it is also possible to pivot the shaft about its central axis. Continuous belts in the form of conveyer devices are, admittedly, known per se, but according to the invention it is preferable if the axes of rotation of the rotating rollers of this continuous belt are arranged either horizontally or vertically, so that movements of the decoupling unit can be assigned and synchronised with the continuous belt in a way which is suited to its function and spatial dimensions. If the axes of rotation of the rotating rollers of the continuous belt extend horizontally, for example, then the continuous belt should have appropriate recesses, whereby the pivotable rotating member can travel through in a straight line during its translatory movement when the continuous belt is at a standstill, before it is disengaged again from the continuous belt. It is, however, conceivable for the axes of rotation of the rotating rollers of the continuous conveyer to be arranged vertically, because then the direction of translatory movement or that of the first axis of rotation of the rotating member can be set up adjacently to the continuous belt.

It is also favourable according to the invention if, fixed to the rotating member of the decoupling unit is a flat receiving plate oriented transversely with respect to the first axis of rotation, and having locking means for engagement with the workpiece carrier. For each of the two afore-mentioned possible arrangements of the continuous belt, the latterly mentioned device can be used with the receiving plate. The plate serves the purpose of receiving the workpiece carrier, and it therefore permits a mechanical coupling between the rotating member which can preferably be designed as a shaft, and between the workpiece carrier, so as to move it in the desired way in the space. Therein, it is expedient to provide the receiving plate with locking means, such as pins for example, preferably expanding pins which can be pre-stressed with springs and engage in recesses on the workpiece carrier and can be engaged and disengaged by being pushed in or pulled out. Alternatively, the expanding pins can also be moved into the withdrawn position or into the expanded position by means of special control devices. The preceding measures serve to create a reliable and firm coupling between the rotating member and the workpiece carrier, so that when the decoupling unit makes short stroke movements, it is possible for the workpiece carrier to be accurately released from the conveyer line, twisted and placed on the conveyer line.

It is also advantageous according to the invention if insertion members are fixed to the workpiece carrier, which insertion members extend in the direction of the first axis of rotation, and which can be introduced into corresponding receiving members secured to the conveyer line.

Beneath the line, it is understood that members are arranged which extend behind one another and which are movable relative to each other, so that the continuous belt itself could be considered as being a conveyer line. However, it is also preferable if a series of other members can be secured, in line form, to the continuous belt which, in turn, as the conveyer line, carries the afore-mentioned receiving members. In any case, with the invention of the embodiment under consideration, it is important that the receiving members are secured to a conveyer line, and are themselves therefore arranged in line form, i.e. in the form of a plurality of successively arranged receiving members. If the workpiece carrier now has insertion members extending in the afore-mentioned direction, namely in the direction of the first axis of rotation, then these can easily be introduced into the receiving members secured to the conveyer line. This is the way they are connected. The workpiece carrier can be released from the conveyer line in this way and thus from the continuous belt, and can be inserted again after the twisting operation.

Therein, it is particularly expedient if according to the invention the workpiece carrier is in the form of a sleeve-like hollow body at least partially embracing the workpieces, the central longitudinal axis of which is disposed in a position arranged on the conveyer line parallel to the first axis of rotation, and on the side walls are secured at least two guide plates which are arranged at an angle to each other and which have guide rails in the form of insertion members. The workpiece carrier is thus connected to the conveyer line at its side walls, wherein the connection is effected by an insertion movement made to the guide rails. In reverse, release is effected by withdrawing the guide rails arranged preferably at the sides of the guide plates from the receiving members on the conveyer line. The workpiece carrier is thus released from the conveyer line, and can now be twisted about the desired angle. This is preferably 90°, but can, however, be any other angle depending on the embodiment. A further guide plate with lateral guide rails is arranged on the side wall of the workpiece carrier at an appropriate angle, in the case of the preferred embodiment under consideration here at 90° with respect to a guide plate with its two guide rails, so that after the workpiece carrier has been released from the conveyer line and after the workpiece carrier has been turned through this angle which is preferably 90°, the workpiece carrier can be brought to engage again correspondingly with the conveyer line. Prior to this latter engagement, there is another guide plate with laterally arranged guide rails which is oppositely disposed to the conveyer line, so that by translatory movement of the pivotable rotating member, the guide rails only now need to be introduced into the receiving members on the conveyer line. The workpiece carrier has thus been engaged in the conveyer line again. By having a workpiece carrier like this which is designed as a hollow body it is possible to transport workpieces which are approximately of cylindrically-shaped configuration, and to twist them in the desired way. It is preferable if guide plates are arranged on the side walls of the workpiece carrier in the form of a hollow body, which are arranged such that when the workpiece carrier is viewed in plan looking in the direction of its longitudinal extent, they are arranged in polygonal configuration, for example, with the entire periphery of the workpiece carrier being provided with guide plates; the number thereof being such that whenever a workpiece is being twisted, or before and after the twisting operation one guide plate with the guide rails thereof is always oppositely disposed to the receiving members on the conveyer line. With a turn through 90°, the workpiece carrier could carry four guide plates on the outside.

It is also advantageous according to the invention if the conveyer line has a continuous row of plates which are arranged on the continuous belt, to which plates retaining grooves in the form of catches are secured to act as receiving members for the insertion members of the workpiece carrier, wherein the continuous belt is preferably provided so that it rotates about vertical axes. The description here is that of the already mentioned embodiment, wherein the actual plane of the continuous belt extends vertically in the region of its straight empty belt, wherein with regard to the series of plates arranged thereon, if a plane is imagined as being disposed through the plates, this plane is likewise arranged vertically. The afore-mentioned catches then extend vertically whereby retaining grooves are formed in the same direction. It can easily be imagined that guide rails can be inserted into retaining grooves of this kind or can be withdrawn from them again. Abutments are also preferably arranged on the plates, so that with the embodiment under consideration here with the vertical extents and planes, weight can displace one workpiece carrier only as far as the abutments. A defined position in height is thus determined, so that the guide plates with the workpiece carriers then hang on the continuous belt at the correct height since the plates secured to the continuous belt are moved at a height which can be adjusted accurately. The series of plates can be imagined as being arranged over the entire length of the continuous belt, and so accordingly many workpiece carriers could thus be secured to the continuous belt, so that when the continuous belt moves forward intermittently, the conveyer device in question has a very high transportation capacity.

It is also advantageous according to the invention if the plate is substantially flat, if the retaining grooves are arranged at a spacing from each other, extend only over a part of the height of the plate extending in the direction parallel to the first angle of rotation, and extend in this very direction, and if their open sides are oriented so that they face each other, and that provided between the retaining grooves is an outwardly open, partly cylindrical casing-like bay. The arrangement of the retaining grooves in the direction of the first axis of rotation can best be described if a view is taken along the retaining grooves which thus are of a U-shaped configuration with the two open ends of the U being in opposite relationship to each other. The bay disposed between the retaining grooves which are arranged in this way represents a part circular line when viewed in this same direction, or it can also be described as a mould if viewed in a direction vertically thereto. It is provided to enable the workpiece carrier next to the plate to be twisted even if the workpiece carrier is turned very close to the plate and requires the space of the bay in order to be able to move past the plate with the bay when the outer parts e.g. the guide plates are being turned.

With an advantageous further embodiment of the invention, there is a second decoupling unit at a spacing of at least one of the plates arranged in a continuous row on the continuous belt. This second decoupling unit is arranged in the transportation direction of the continuous belt behind the first decoupling unit, and both decoupling units have a common drive means, preferably with air cylinders. With this particular embodiment under consideration, it is to be imagined that a continuous row of plates is arranged on the continuous belt, which plates move intermittently together with the continuous belt in said direction of transportation. If one of these plates is pulled out, if it has reached a specific position when the continuous belt has come to a standstill, and if it is supposed that the belt is in the very position in which the first decoupling unit can engage, then the second decoupling unit is taken behind it at said spacing such that a plate is arranged above the second decoupling unit when the continuous belt is at a standstill, and a further plate is disposed therebetween where there is, however, no decoupling unit. It is even particularly preferable if the second decoupling unit is arranged at a spacing of two plates behind the first one. In other words, two more plates are then disposed between the two plates which are each arranged directly above the decoupling units. With the embodiment under consideration, the continuous belt therefore has to be moved from the first standstill position through three steps into the standstill position which is thus the fourth standstill position, so that the position with the second decoupling unit is reached. If the decoupling unit is thus beneath the first plate, so to speak, then the distance to the second decoupling unit is selected such that the second decoupling unit is disposed above the fourth plate. By way of these measures, it is possible for two workpiece carriers and the workpieces which are disposed therein to be turned simultaneously. Therein, it is particularly advantageous if, with one stroke movement, the continuous belt is moved forward across the length of two plates, and not only over the length of one plate. Then, even with the embodiment where there are two decoupling units at the afore-mentioned spacing from each other, in each decoupling unit only one workpiece carrier is ever turned so that it is decoupled and then coupled again.

It is preferable according to the invention if a device of this kind is used for turning paper casings provided with a longitudinal sealing seam for manufacturing a pack for liquids. With an application such as this, it is important for the longitudinal sealing seam of a plastics-coated paper casing or cardboard casing to be arranged correctly with respect to the other processing stations. Empty paper casings can very advantageously be held by the workpiece carrier designed as a hollow body, and they can be handled in the afore-described way.

The device according to the invention for twisting workpieces, e.g. paper casings, is effected expediently and accurately by pneumatic means. For example, both the rotating members, in the form of shafts, of the two decoupling units can be mounted so that one bearing of each of them is disposed in a guide bridge which thus connects the two shafts of the two decoupling units in overlapping manner. The shafts are, at the same time, mounted for rotational movement. If, for example, one air cylinder with appropriate hinges is arranged on the guide bridge, then both rotating members can be turned jointly by this one air cylinder. Also, if the guide bridge is displaced by translatory movement in a direction parallel to the first axis of rotation of the rotating members, then both rotating members are thus moved simultaneously in translatory movement. This movement in a straight line can be produced very favourably by means of a cam which permits a lever to be pivoted about a point of rotation such that the guide bridge always brings about translatory movement of the rotating member synchronously with the other movements made by the machine, and always at the correct time.

By way of the device according to the invention, it is possible for paper casings coming from a first processing station to be received properly in the workpiece carriers, for them to be further conveyed by the continuous belt in the transportation direction which may be horizontal, for example, for them to be decoupled at the specified first position at a spacing of two plates at the afore-described second specific position, by being lifted from the conveyer line, and for them to be turned simultaneously through 90°, and by lowering the rotating members and thus the workpiece carrier connected thereto, they can be connected to the conveyer line again, and conveyed further horizontally in the transportation direction after attachment to the continuous belt. When a continuous belt of this kind is moved with stroke motion intermittently across the length of two positions or two plates of the kind described, each sleeve is safely pivoted through the desired turn in this way by the two decoupling units so that further operations can be carried out in the direction of transportation beyond the conveyer device.

Further advantages, features and possible applications of the present invention will emerge from the following description, given in conjunction with the accompanying drawings of a preferred embodiment, wherein.

Figure 1:
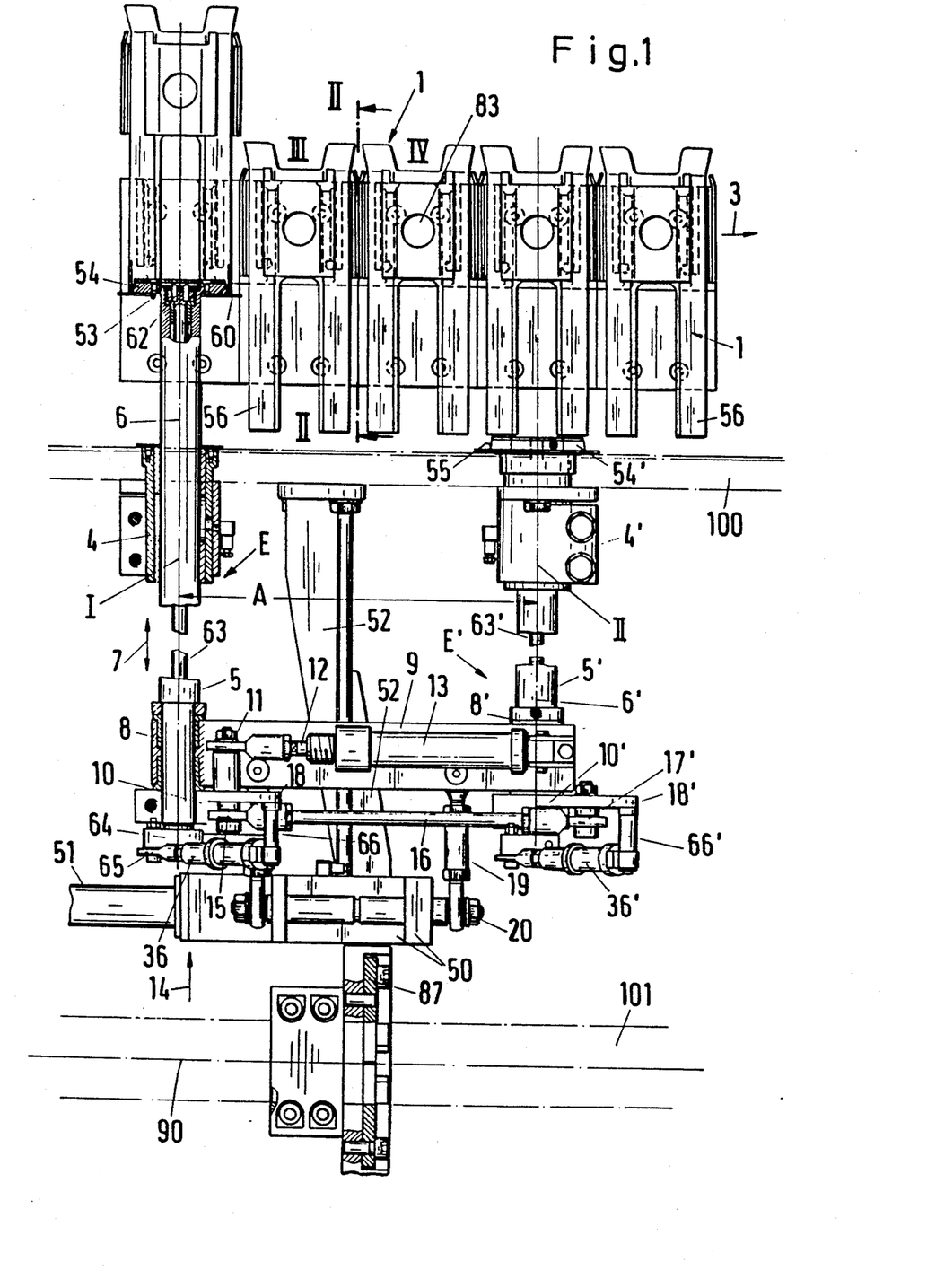
FIG. 1 shows the partially broken away and partially sectional illustration of the overall view of basic components of the twisting device, with the drive means at the bottom and the workpiece carriers at the top.

FIG. 1 shows a clear plan view of the device, as a whole, for twisting workpiece carriers denoted generally by the reference numeral 1. Here, four workpiece carriers 1 are disposed on a conveyer device, denoted in general in FIG. 2 by the reference numeral 2 at the normal transportation height on a straight line 3 which is to be imagined as being horizontal, and wherein the direction of transportation is represented by an arrow, whilst the rear-most workpiece carrier 1 in the transportation direction 3 is shown in the raised disengaged condition wherein rotation is possible. A first upper friction bearing 4 is secured to the machine frame 100 in position I, and a second upper friction bearing 4' is secured in position II at a spacing A of two workpiece carriers 1. The rotating member 5 or 5' which is designed as a hollow shaft is able to be moved in the friction bearing 4 by rotational movement about the first axis of rotation 6 or 6' and by translatory movement in the direction of the two-directional arrow 7. If the conveyor device 2 advances each of the workpiece carriers 1 gradually through two positions, then it makes sense to select the spacing A between the two friction bearings 4 and 4', as shown, so that the workpiece carrier 1 can be lifted in both positions I and II at the same time, and so that decoupling, turning, lowering and coupling operations can be carried out. In FIG. 1, however, for the purpose of clarity, the workpiece carrier 1 is raised in position I and the other workpiece carrier is shown at the same time as being in the unraised position in position II. Between them are positions III and IV, wherein beneath the workpiece carriers no decoupling units E or E' are shown in these positions III, IV, which denote the drive means for moving the workpiece carrier 1 and the basic component of which is the rotating member 5 or 5'.

The drive means for a decoupling unit E will now be mentioned with the aid of the decoupling unit E shown to the left in FIG. 1. The rotating member 5 is mounted in a second friction bearing 8 which is connected to the friction bearing 8' of the oppositely disposed decoupling unit E' by means of a guide bridge 9 in such a way that when the guide bridge is moved in the direction of the first axis of rotation 6, thus in the direction of the two-directional arrow 7, both rotating members 5 and 5' are displaced in translatory movement in the direction of their first axis of rotation 6 or 6'. After the workpiece carrier has been decoupled, the rotating member 5 which is designed as a hollow shaft (and also the corresponding rotating member 5') can be rotated in the friction bearing 8. For this rotational movement, the turning lever 10 engages on the outside of the rotating member 5, which lever turns firstly about the first axis of rotation 6 and then by way of the hinge 11, and the piston rod 12 of the air cylinder 13 is actuated for this rotational movement. Looking from the bottom machine frame 101 in the direction of the arrow 14 to the top of the frame 100, when the air cylinder 13 is actuated, the piston rod 12 is pushed out to the left and causes the turning lever 10 to be turned 90° anti-clockwise.

A joint 15 is also arranged on the turning lever 10 to provide for pivotal movement of a push rod 16 with an oppositely disposed joint 17, so that when the right end 18 of the turning lever 10 is twisted out upwards away from the person looking at it, the push rod 16, by its deflection, is responsible for seeing that the right turning lever 10' turns anti-clockwise, looking in the direction of the arrow 14 i.e. the right end 18' thereof is opposite the observer in FIG. 1. Thus, the rotating member 5' disposed in position II also rotates about its first axis of rotation 6' in the same way as with the decoupling unit E in position I. Both these rotating members 5, 5' are thus turned by one and the same air cylinder 13 which is controlled accordingly. This is how the rotating member 5, 5' rotates.

Translatory movement from the lower machine frame 101 to the upper machine frame 100 and back in the direction of the two-directional arrow 7 is effected by the guide bridge 9 which is pushed up and down by a push rod 19 in the direction of the two-directional arrow 7. By way of its lower hinge 20, the push rod 19 is rotatably connected to a lever 50 which extends in the transverse direction parallel e.g. to the guide bridge 9, to the air cylinder 13 disposed thereon, and also parallel to the push rod 16. The lever 50 also extends in the direction which is viewed in FIG. 1, i.e. from the front lever part 50 to the rear, where an axis of rotation 51 can be seen in the background, broken away, and about which the lever 50 can turn last of all in the direction of the two-directional arrow 7. The axis of rotation 51 is not movable by translation but is secured immovably to the support means 52, which, in turn, is arranged on the machine frame 100. Thus, the entire decoupling unit E or E' together with the rotating members 5 or 5' moves with translatory movement in the direction of the two-directional arrow 7. The translatory movement of the pivotable rotating member 5, 5' has thus also been described.

The rotating member 5 (and also the other rotating member 5') is designed as a hollow shaft because there are engagement means generally denoted by the reference numeral 53 which can be controlled. Whereas the lower end of the rotating member 5 can be driven so that it is clamped by the rotating lever 10 or so that it is secured elsewhere, at the upper end of the rotating member 5 there is a flat receiving plate 54 which is oriented transversely with respect to the first axis of rotation 6, which can be seen in plan in FIG. 11. On the outside thereof, the plate has a slanted edge 55 which can be seen, for example, in FIG. 11 by the double lines, and the profile of which can also be seen in FIG. 1. The slanted edge 55 is to help the receiving plate 54 engage better in the lower end of the workpiece carrier 1, as will be described.

Figure 11:
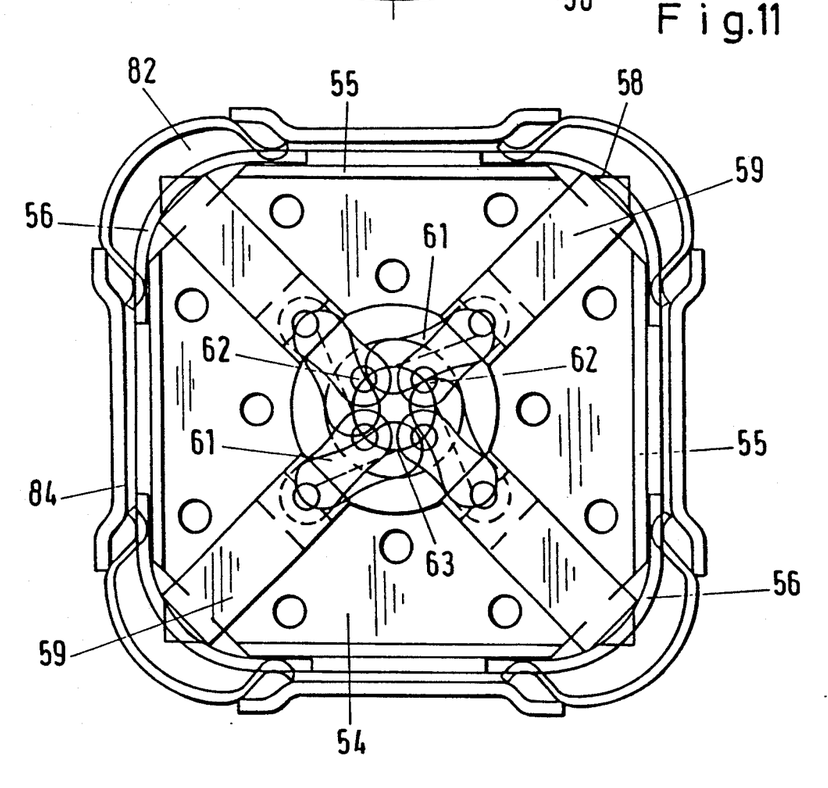
FIG. 11 shows a plan view of the engaged workpiece carrier and receiving plate and engaged expanding pins.

So-called corner guide means 56 of the workpiece carrier 1 are of arcuate design, so that their axis of curvature is parallel to the central longitudinal axis 57 of the workpiece carrier 1. In the bottom region of the four corner guide means 56 there are respective holes 58 arranged in the centre, into which holes expanding pins 59 can be introduced, which are arranged movably radially in the receiving plate 54. In the decoupling position, these expanding pins 59 can be taken out from the outer circumference of the slant 55 of the receiving plate 54; whilst for the rotating member 5 and its receiving plate 54 to engage with the corner guide means 56 of the workpiece carrier 1, the expanding pins 59 are expanded or moved radially outwardly in such a way that the points of the expanding pins 59 engage in the holes 58, at the bottom, in the corner guide means 56, whereby the corner guide means 56 are then connected to the receiving plate 54 and firmly coupled thereto by the bottom edges of the corner guide means 56 resting on the edges of a flat plate 60, which is secured beneath the receiving plate 54 and at the same plane as the lower end of the slanted edges 55.

The expanding pins 59 are driven as shown in FIG. 11 by cams 61, wherein the number of cams is equal to the number of expanding pins 59, four in the embodiment shown. The cams 61 are rotatable about four pins 62 which are rotatably driven on a common circle 63 about the central longitudinal axis 57 of the workpiece carrier 1, which axis 57 also passes through the centre of the receiving plate 54 (the point marked with a cross in FIG. 11), so that as can be seen in FIG. 11, when the pin 62 is turned clockwise through a one-eighth rotation, the cams 61 are pushed radially outwardly to such an extent that the tip of the expanding pins 59 reaches through the holes 58 for the purpose of engaging. This is the position of engagement. In reverse, the tips are disengaged from the holes 58 in the corner guide means 59 by the expanding pins 59 being withdrawn, namely by rotating the pin 62 through another 45° anti-clockwise about the central longitudinal axis 57 of the workpiece carrier 1, which, in this case, coincides with the first axis of rotation 6.

The pin 62 is turned by a rod 63 (FIG. 1) or 63' being rotated, at the upper end of which the four pins 62 are inserted. The lower end of the rod 63 is clamped to a cam which, itself, turns about the first axis of rotation 6 and which bears the hinge 65 eccentrically, on which hinge the air cylinder 36 engages (corresponding to 36' in the other decoupling unit E'), in order to carry out pivotal movement about the first axis of rotation 6. The end of the air cylinder 36 or 36' which is oppositely disposed to the hinge 65 is secured to a bolt 66, which, in turn, is connected to the right-hand front end 18 (or to the bolt 66' secured to the end 18') of the above-described turning lever 10. This is advantageous in that the inner rod 63 or its position of rotation with respect to the hollow shaft in the form of a rotating member 5 which embraces the rod 63 concentrically is even kept when the rotating member 5 moves in rotation. Thus, the rod 63 is only turned in the rotating member 5 (or the rod 6' in the rotating member 5') if the air cylinder 36 or 36' is actuated, whereby the receiving plate 54 secured to the rotating member 5 is decoupled from the workpiece carrier 1, or the decoupling operation is controllable separately.

Figure 2:
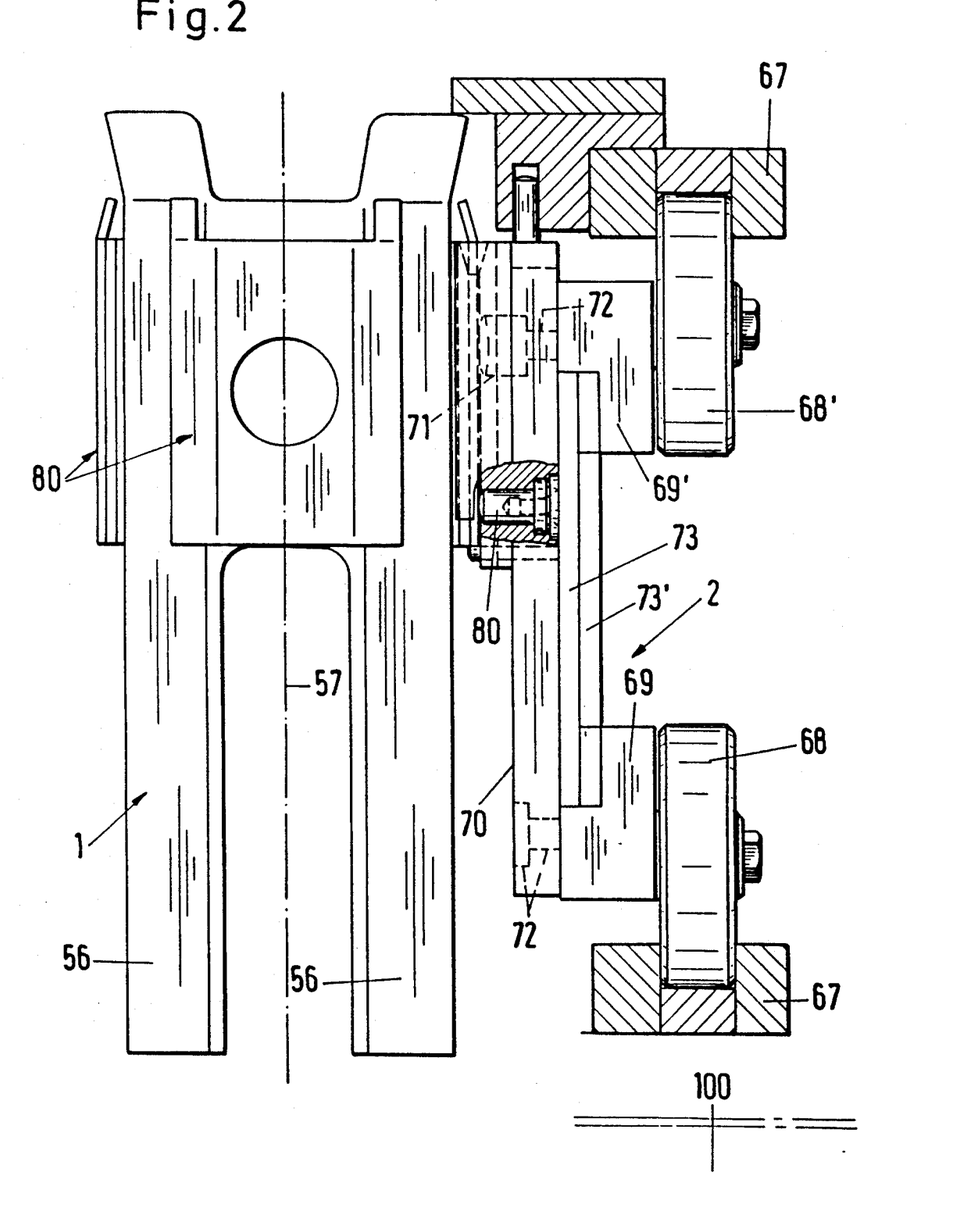
FIG. 2 shows a workpiece carrier on an enlarged scale, wherein a plate and the guide means thereof is arranged, as viewed in FIG. 1 in the direction of the arrow II—II.

If the view II—II is considered in FIG. 1, the view is the same as that in FIG. 2 with parts which are partly broken away. The frame 100 can again be seen at the bottom right, to which frame a lower rail 67 and an upper rail 67' at a spacing therefrom are immovably arranged, in order to guide rollers 68, 68'. The axes of rotation of the rollers are disposed on shims 69, 69' by means of which a toothed belt 73 of plastics material is secured in holes 72 by screws 71 by means of a plate, generally denoted by the reference numeral 70, of which belt the teeth 73' disposed to the right in FIG. 2 engage in drive wheels and direction-changing wheels, not shown, in such a way that the main plane of the straight empty belt, shown in section in FIG. 2, of the continuous belt 73 is disposed vertically. Thus, the basically flat plate 70 to which the worktool carrier 1 is held by the insertion members 80 is disposed so that it is vertically parallel. In this way, the workpiece carriers 1 which are disposed, in the plan view of FIG. 1, in a row behind one another, can be guided and displaced in the direction of transportation 3 using the rollers 68, 68' in the guide rails 67, 67'.

Figure 5:
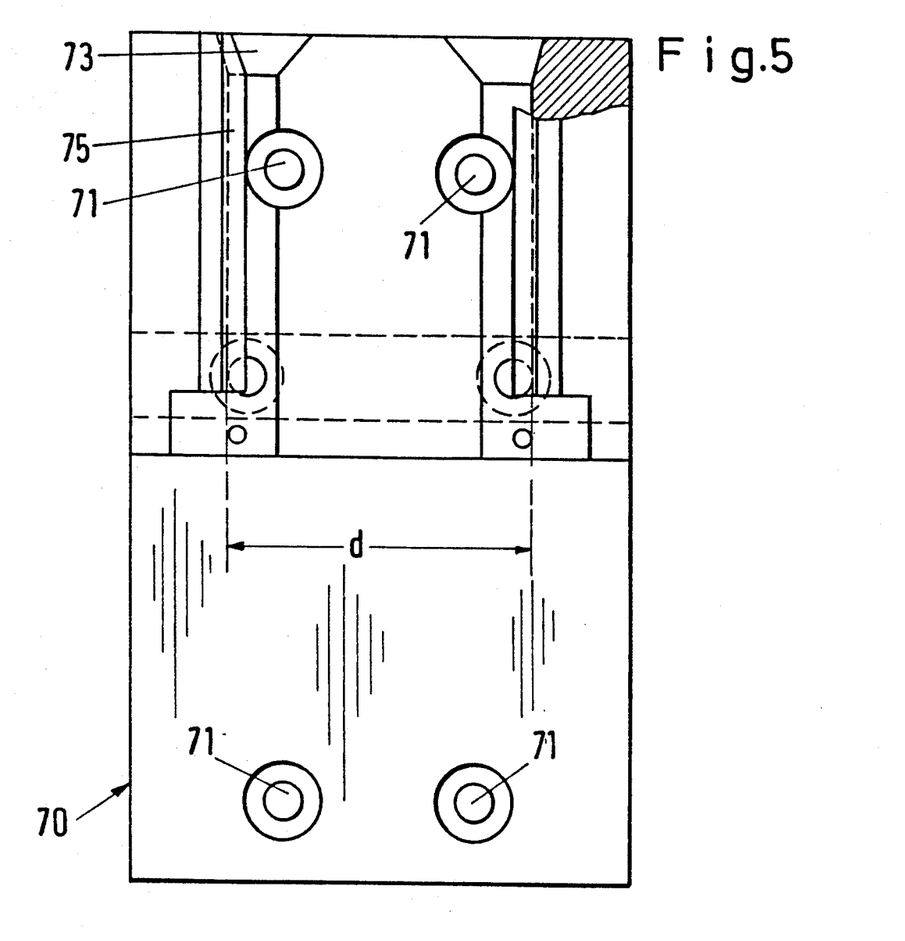
FIG. 5 shows a plan view of the plate in FIG. 3, looking from right to left.
Figure 6:
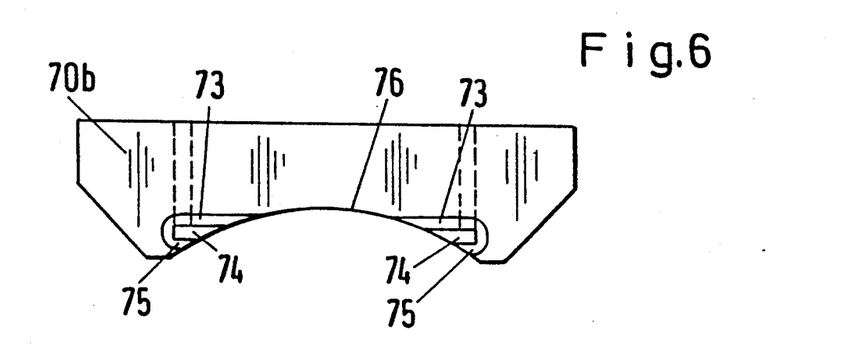
FIG. 6 shows a plan view of the plate, looking in FIGS. 3 and 5 from top to bottom.
Figure 7:
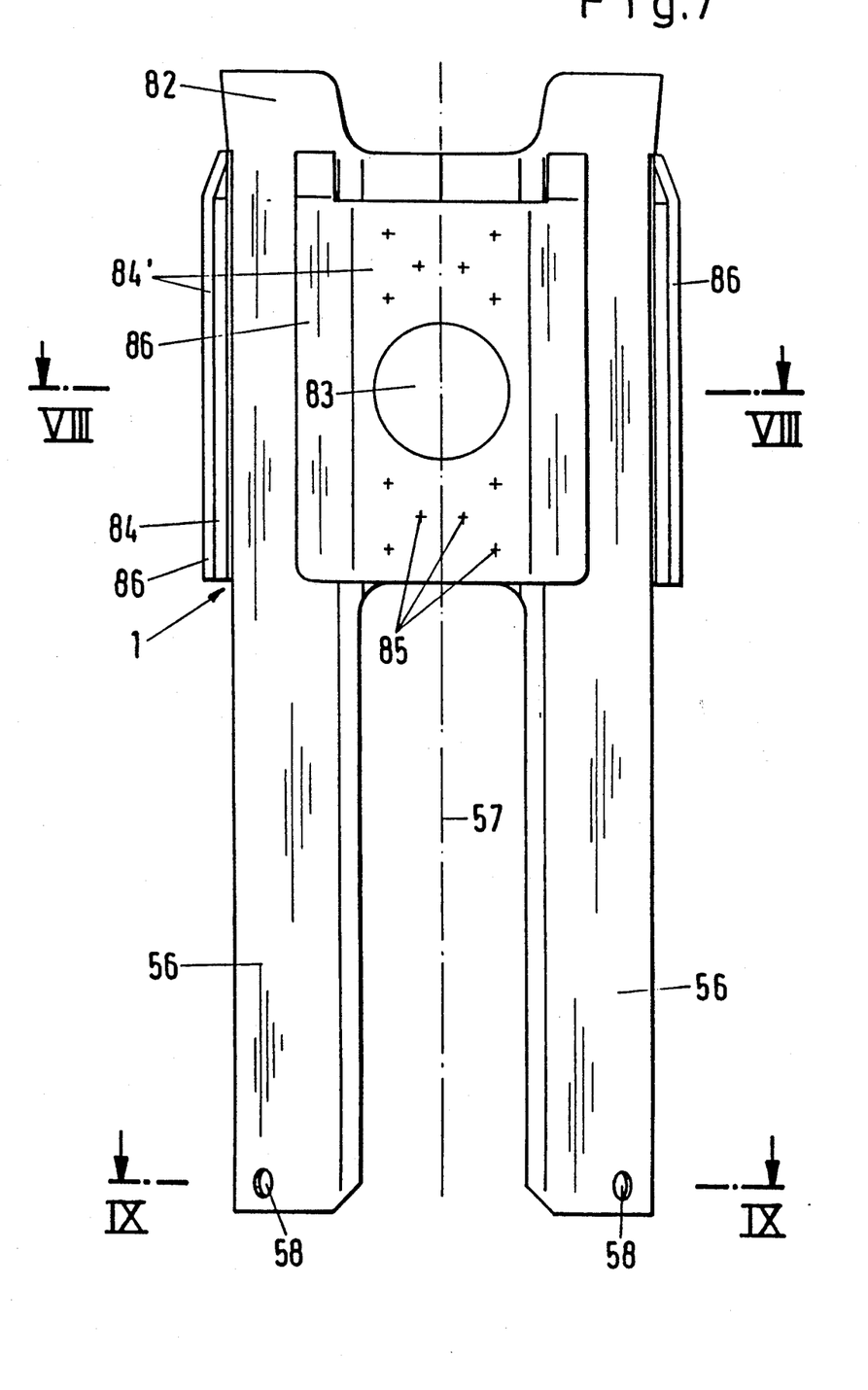
FIG. 7 shows a side view, on an enlarged large scale, of a workpiece carrier.
Figure 8:
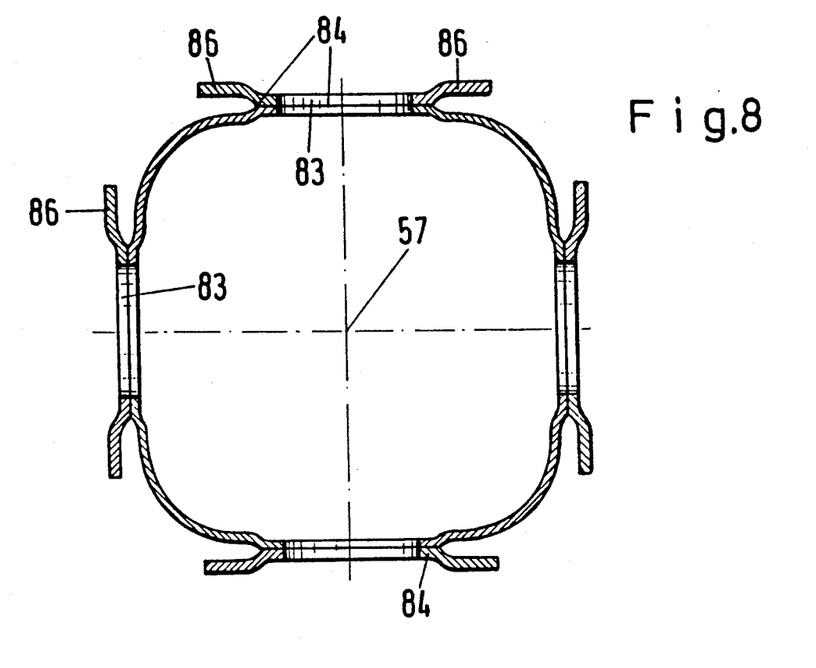
FIG. 8 shows a cross-sectional view along the line VIII—VIII in FIG. 7.
Figure 9:
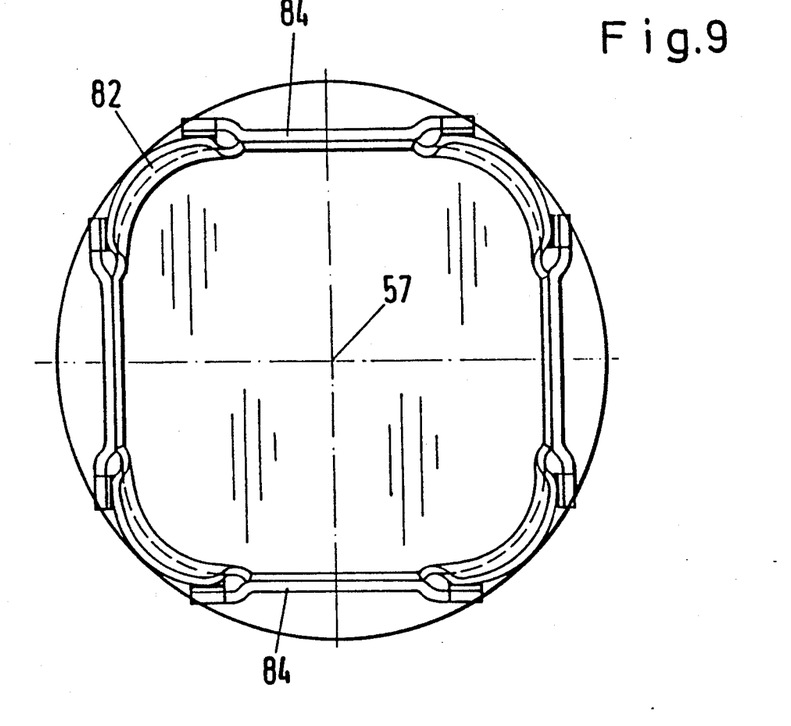
FIG. 9 shows a plan view of the workpiece carrier, if, for example, a view is taken of FIG. 7 from the top to the bottom.
Figure 10:
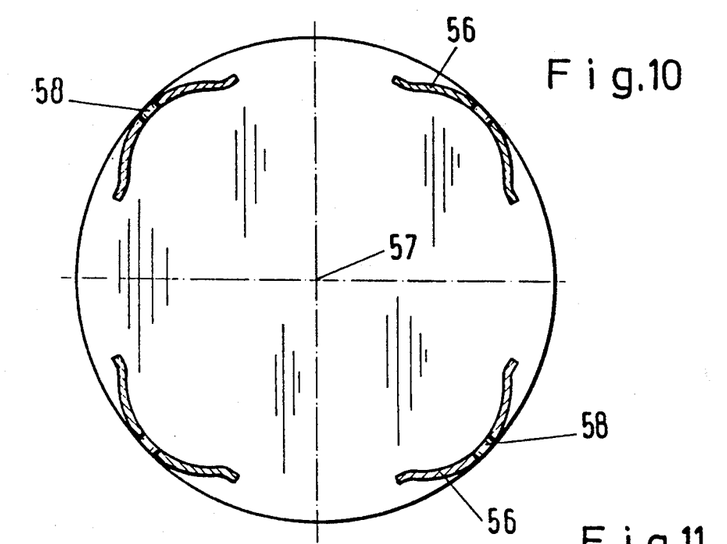
FIG. 10 shows a sectional illustration through the corner guide means of the workpiece carrier along the line IX—IX of FIG. 7

The plates 70 which are arranged behind one another in a line in a continuous row on the continuous toothed belt 73 can best be seen in FIGS. 3 to 6. The plate 70 which extends over about two thirds of the height of the workpiece carrier 1 at the height H consists of a lower member 70a which is thinner in the sectional view of FIG. 3 and of a thickened upper portion 70b. The step 70c which separates both these portion 70a, 70b from one another is arranged approximately in the centre at half the height H of the plate 70. The receiving holes 72 for the fixing screws 71 can be seen in the upper, thickened portion 70b on the belt, but there are also two holes 71 in the bottom portion 70a. As a result of these four holes 71, it is possible for the plate 70 to be arranged very well and very stably on the continuous toothed belt 73. On the upper side of the thickened portion 70b of the plate 70, which side is oppositely disposed to the step 70c, it is possible to see insertion bevels 73 which extend in a U-shaped configuration like an elongate funnel, as seen in FIG. 6, and which make a transition to the bottom into retaining grooves 74, which, in the plan view of the plate 70 in FIG. 5, are covered at the front by catches 75 which also form the retaining grooves 74. The plate 70 which is basically flat, the main plane of which extends parallel to the plane of the paper in the illustration in FIG. 5, has a bay 76 between the retaining grooves 74 of U-shaped configuration in cross-section, and which are arranged at a spacing d from one another. The bay can also be seen clearly in the cross-sectional view of FIG. 4. It is in the form of a partly cylindrical casing surface and is needed in order to enable the workpiece carrier 1 on the plate 70 to be turned past the central longitudinal axis 57 of the workpiece carrier 1, without the corner guide means 56 of the workpiece carrier 1 hitting the thickened portion 70b of the plate 70. The upper thickened portion 70b of the plate 70 is thus of a stronger design, so that it is possible for it to be properly secured to the continuous belt 73 without play, whilst the thinner portion 70a of the lower half in relation to the height H of the plate 70 can be smaller in size to economise on material. It is also expedient if this plate 70 is manufactured from a hard plastics material, e.g. from a duroplastics material or the like.

Figures 3, 4, 4A:
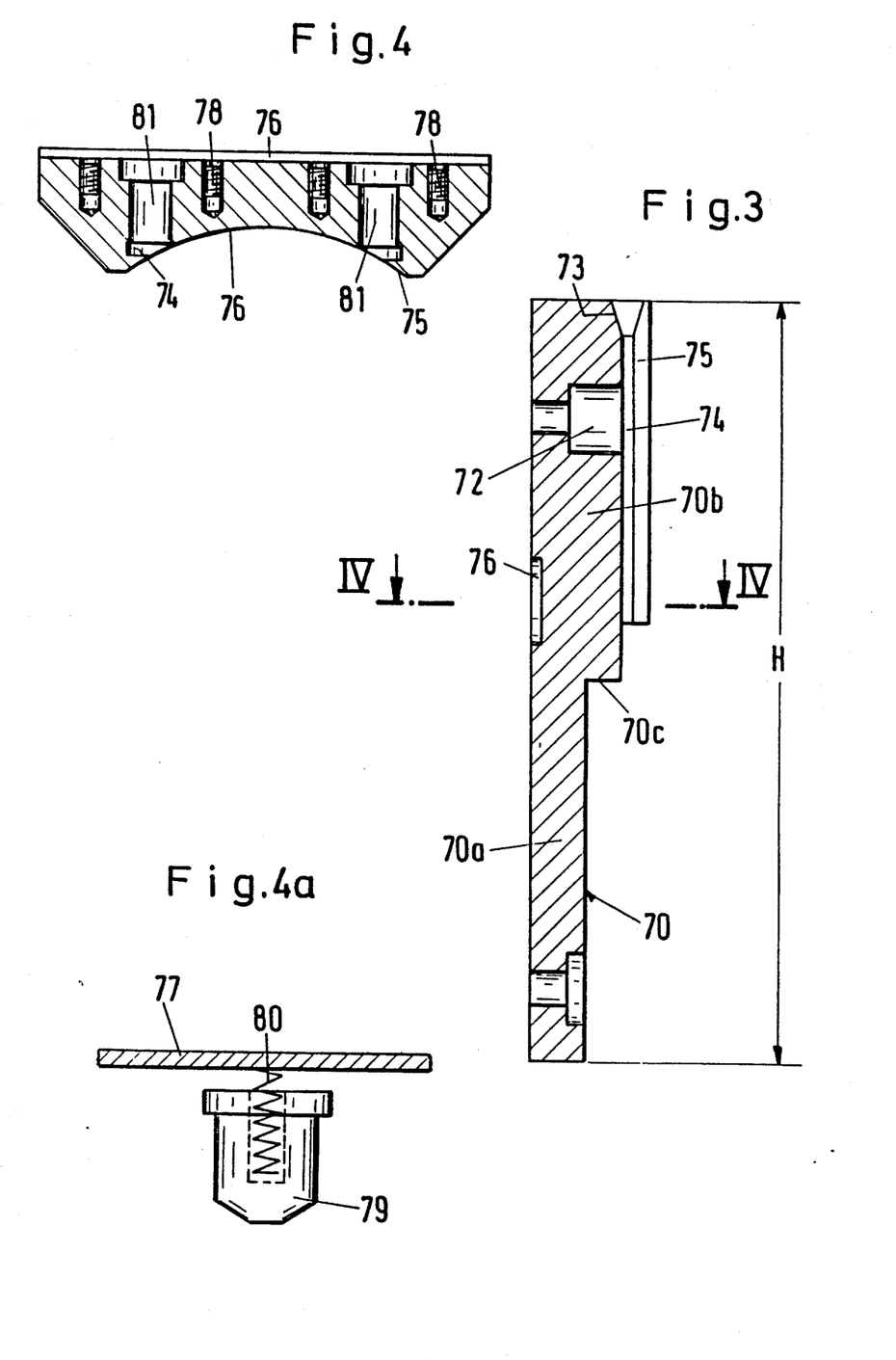
FIG. 3 shows a cross-sectional view of the plate, wherein the upper part of increased thickness projects to the right.
FIG. 4 shows a cross-sectional view through the plate along the line IV—IV in FIG. 3.
FIG. 4a shows a cross-sectional view of the releasable clamping means for the insertion members.

On the reverse side, the plate 70 has a groove 76 at the height which is shown by a broken line IV—IV in FIG. 3, in which groove a hard plate 77, shown by diagonal lines in FIG. 4a, can be secured by screw bolts 78 which are inserted in the thickened portion 70b. The plate 77 is responsible for pushing clamping bolts 79 against the force of compression springs 80 in two holes 81 to the front at the side of the bay 76, so as to provide a pressure contact and clamping contact with the insertion members 80 of the workpiece carrier 1, so that this rests firmly against the plate 70 and thus firmly on the continuous belt.

Whilst the retaining grooves 74 formed by the catches 75 on the front of the plate 70 represent the receiving members for the insertion members 80 of the workpiece carrier 1, the design of the insertion members 80 can be explained well if the workpiece carrier 1 is considered in conjunction with FIGS. 7 to 11.

The workpiece carrier 1 is designed as a sleeve-like hollow body with a central longitudinal axis 57 and a shape which is quadratic in cross-section and which has rounded corners. The afore-mentioned corner guide means 56 extend from the lower edge next to the holes 58 for fixing the workpiece carrier 1 to the receiving plate 54 up to the top to insertion bevels 82, which, in the plan view of the workpiece carrier 1 in FIG. 11, are bevelled slightly more inclinedly with respect to the central longitudinal axis 57 than with the embodiment according to FIGS. 7 to 10. However, they have the same function.

Side walls extend between the corner guide means 56 disposed at the four corners of the clamped hollow body, quadratic in cross-section, of the workpiece carrier 1, in the middle of which side walls there is a large hole 83 on each of the four lateral surfaces, so that irrespective of rotation about the central longitudinal axis 57 (through e.g. 90° gradually, for example) there is always an opening for a pressure stamp which is introduced through the hole 83 to reduce the volume of the sleeve carried in the workpiece carrier 1. Also, between the corner guide means 56, there is enough space to introduce pressure stamps or the like. On the outside, a guide plate 84 is provided by means of spot welding at 85 on each of the substantially flat side walls. It is to be appreciated that the corresponding hole 83 is arranged in the guide plate 84 so that it meets the hole 83 in the respective side wall. Offset guide rails 86 in the form of insertion members 80 are formed on the longitudinal edges extending parallel to the central longitudinal axis 57. It can be seen in particular in FIG. 8 that these guide rails 86 can be pushed into the retaining grooves 74 of the plate 70 which are shown in FIGS. 5 and 6, from the top to the bottom in a direction parallel to the central longitudinal axis 57.

During operation, the continuous toothed belt 73 made of plastics material is displaced about direction-changing toothed wheels, not shown, having vertical axes, so that the straight empty belt which can be seen to the front of FIG. 1 extends vertically. Disposed on this continuous belt 73 is the row of plates 70 and retaining grooves 74 and fixing devices 79, 80 which are arranged in the form of a continuous line, so that the workpiece carrier 1 and its guide rails 86 are held stably and fixedly by the respective plate 70. The row of workpiece carriers 1 now moves like a line in the direction of transportation 3. If the front workpiece carrier 1 under consideration has reached position II, and if the back one has reached position I, then when the cam 87 shown in FIG. 1 and rotating about the axis of rotation 90, is in the relevant position, the lever 50 which can be pivoted about the axis of rotation 51 is pushed up so that the guide bridge 9 pushes up the two rotating members 5, 5' into the position shown to the left in FIG. 1. At the same time, the air cylinders 36, 36' are responsible for radially spreading the spreading pins 59, so that the corner guide means 56 of the two workpiece carriers 1 are firmly anchored to the two receiving plates 54, 54'. After the decoupled position has been reached, the air cylinder 13 is actuated and turns each of the two workpiece carriers 1 about 90°, whereupon the cam 87 is further turned accordingly so that the guide bride 9 is lowered and causes the workpiece carrier 1 to be coupled to the plates 70 thereof. The air cylinders 36, 36' withdraw the expanding pins 59, and the workpiece carriers 1 now hang freely on the belt 73, which is displaced further through two positions in the transportation direction 3, so that the rear workpiece carrier which has just been turned is conveyed from position I into position IV. It no longer turns, and is not even needed.

We claim:

1. A device for twisting workpiece carriers which are transported by a conveyor device, the improvement comprising a work piece carrier detachably arranged on the conveyor device and adapted to be brought into engagement with a decoupling unit, said unit comprising a rotating member which is pivotally driven about a fixed first axis which axis is oriented vertically to the transportation direction of the conveyor device, characterised in that fixed to the workpiece carrier are insertion members which extend in the direction of the first axis of rotation and which can be introduced into corresponding receiving members secured to the conveyor device.

2. A device for twisting workpiece carriers which are transported by a conveyor device, the improvement comprising a work piece carrier detachably arranged on the conveyor device and adapted to be brought into engagement with a decoupling unit, said unit comprising a rotating member which is pivotally driven about a fixed first axis which axis is oriented vertically to the transportation direction of the conveyor device, characterised in that the workpiece carrier is in the form of a sleeve-like hollow body at least partially embracing the workpieces, the central longitudinal axis of which is disposed in a position arranged on the conveyor device parallel to the first axis of rotation and on the side walls are secured at least two guide plates which are arranged at an angle to each other and which have guide rails in the form of insertion members.

3. A device for twisting workpiece carriers which are transported by a conveyor device, the improvement comprising a work piece carrier detachably arranged on the conveyer device and adapted to be brought into engagement with a decoupling unit, said unit comprising a rotating member which is pivotally driven about a fixed first axis which axis is oriented vertically to the transportation direction of the conveyer device, characterised in that the conveyer device has a continuous row of plates which are arranged on the conveyer device, to which plates retaining grooves in the form of catches are secured for receiving insertion members attached to each workpiece carrier where the conveyer device is preferably provided so that it rotates about vertical axes.

4. A device for twisting workpiece carriers which are transported by a conveyer device, the improvement comprising a work piece carrier detachably arranged on the conveyer device and adapted to be brought into engagement with a decoupling unit, said unit comprising a rotating member which is pivotally driven about a fixed first axis which axis is oriented vertically to the transportation direction of the conveyer device, characterised in that said rotating member is a plate which is substantially flat, said plate having retaining grooves arranged at a spacing from each other, which extend only over a part of the height of the plate extending in the direction parallel to the first angle of rotation and extend in this very direction and that their open sides are oriented so that they face each other, and that provided between the retaining grooves is an outwardly open, partly cylindrical casing-like bay.

5. A device for twisting workpiece carriers which are transported by a conveyer device, the improvement comprising a work piece carrier detachably arranged on the conveyer device and adapted to be brought into engagement with a decoupling unit, said unit comprising a rotating member which is pivotally driven about a fixed first axis which axis is oriented vertically to the transportation direction of the conveyer device, and that the pivotable rotating member is driven so that it can move both with rotary movement and with translatory movement in the direction of the first axis of rotation, characterised in that the conveyer device has a continuous row of plates which are arranged on the continuous belt, to which plates retaining grooves in the form of catches are secured for receiving insertion members attached to each workpiece carrier and where the continuous belt is preferably provided so that it rotates about vertical axes, characterised in that at a spacing from at least one of the plates arranged in a continuous row on the continuous belt behind the first decoupling unit there is a second decoupling unit and both decoupling units have a common drive means preferably with air cylinders.

6. A device for twisting workpieces which are transported by a conveyer device, characterised in that a workpiece carrier is arranged detachably on the conveyer device and can be brought into engagement with a decoupling unit which has a rotating member which is pivotally driven about a first axis and that the first axis is oriented vertically to the transportation direction of the conveyer device in that the pivotable rotating member is driven so that it can move both with rotary movement and with translatory movement in the direction of the first axis of rotation, in that the transportation direction of the conveyer device is disposed horizontally, and the first axis of rotation of the rotating member extends vertically, that the rotating member is in the form of a shaft mounted at at least two locations and that the conveyer device has a continuous belt, in that fixed to the rotating member of the decoupling unit is a flat receiving plate oriented transversely with respect to the first axis of rotation and having locking means for engagement with the workpiece carrier, in that fixed to the workpiece carrier are insertion members which extend in the direction of the first axis of rotation and which can be introduced into corresponding receiving members secured to the conveyer device.

7. A device for twisting workpieces which are transported by a conveyer device, characterised in that a workpiece carrier is arranged detachably on the conveyer device and can be brought into engagement with a decoupling unit which has a rotating member which is pivotally driven about a first axis and that the first axis is oriented vertically to the transportation direction of the conveyer device in that the pivotable rotating member is driven so that it can move both with rotary movement and with translatory movement in the direction of the first axis of rotation, in that the transportation direction of the conveyer device is disposed horizontally, and the first axis of rotation of the rotating member extends vertically, that the rotating member is in the form of a shaft mounted at at least two locations and that the conveyer device has a continuous belt, in that fixed to the rotating member of the decoupling unit is a flat receiving plate oriented transversely with respect to the first axis of rotation and having locking means for engagement with the workpiece carrier, in that fixed to the workpiece carrier are insertion members which extend in the direction of the first axis of rotation and which can be introduced into corresponding receiving members secured to the conveyer device, wherein the workpiece carrier is in the form of a sleeve-like hollow body at least partially embracing the workpieces, the central longitudinal axis of which is disposed in a position arranged on the conveyer device parallel to the first axis of rotation and on the side walls are secured at least two guide plates which are arranged at an angle to each other and which have guide rails in the form of insertion members.

8. A device for twisting workpieces which are transported by a conveyer device, characterised in that a workpiece carrier is arranged detachably on the conveyer device and can be brought into engagement with a decoupling unit which has a rotating member which is pivotally driven about a first axis and that the first axis is oriented vertically to the transportation direction of the conveyer device in that the pivotable rotating member is driven so that it can move both with rotary movement and with translatory movement in the direction of the first axis of rotation, in that the transportation direction of the conveyer device is disposed horizontally, and the first axis of rotation of the rotating member extends vertically, that the rotating member is in the form of a shaft mounted at at least two locations and that the conveyer device has a continuous belt, in that fixed to the rotating member of the decoupling unit is a flat receiving plate oriented transversely with respect to the first axis of rotation and having locking means for engagement with the workpiece carrier, in that fixed to the workpiece carrier are insertion members which extend in the direction of the first axis of rotation and which can be introduced into corresponding receiving members secured to the conveyer device, in that the workpiece carrier is in the form of a sleeve-like hollow body at least partially embracing the workpieces, the central longitudinal axis of which is disposed in a position arranged on the conveyer device parallel to the first axis of rotation and on the side walls are secured at least two guide plates which are arranged at an angle to each other and which have guide rails in the form of insertion members, in that the conveyer device has a continuous row of plates which are arranged on the continuous belt, to which plates retaining grooves in the form of catches are secured for the insertion members of the workpiece carrier where the continuous belt is preferably provided so that it rotates about vertical axes.

9. A device for twisting workpieces which are transported by a conveyer device, characterised in that a workpiece carrier is arranged detachably on the conveyer device and can be brought into engagement with a decoupling unit which has a rotating member which is pivotally driven about a first axis and that the first axis is oriented vertically to the transportation direction of the conveyer device in that the pivotable rotating member is driven so that it can move both with rotary movement and with translatory movement in the direction of the first axis of rotation, in that the transportation direction of the conveyer device is disposed horizontally, and the first axis of rotation of the rotating member extends vertically, that the rotating member is in the form of a shaft mounted at at least two locations and that the conveyer device has a continuous belt, in that fixed to the rotating member of the decoupling unit is a flat receiving plate oriented transversely with respect to the first axis of rotation and having locking means for engagement with the workpiece carrier, in that fixed to the workpiece carrier are insertion members which extend in the direction of the first axis of rotation and which can be introduced into corresponding receiving members secured to the conveyer device, in that the workpiece carrier is in the form of a sleeve-like hollow body at least partially embracing the workpieces, the central longitudinal axis of which is disposed in a position arranged on the conveyer device parallel to the first axis of rotation and on the side walls are secured at least two guide plates which are arranged at an angle to each other and which have guide rails in the form of insertion members, in that the conveyer device has a continuous row of plates which are arranged on the continuous belt, to which plates retaining grooves in the form of catches are secured for the insertion members of the workpiece carrier where the continuous belt is preferably provided so that it rotates about vertical axes, in that the plate is substantially flat, that the retaining grooves are arranged at a spacing from each other, extend only over a part of the height of the plate extending in the direction parallel to the first angle of rotation and extend in this very direction and that their open sides are oriented so that they face each other, and that provided between the retaining grooves is an outwardly open, partly cylindrical casing-like bay.

10. The device according to any of claims 2, 3 or 4, wherein the pivotal rotating member is driven so that it can move both with rotary movement and with translatory movement in the direction of the first axis of rotation.

* * * * *